United States Patent [19]

Hütter

[11] Patent Number: 4,507,696
[45] Date of Patent: Mar. 26, 1985

[54] DRUM-SHAPED SCANNING DEVICE

[75] Inventor: Heinrich Hütter, Vienna, Austria

[73] Assignee: U.S. Philips Corporation, New York, N.Y.

[21] Appl. No.: 369,950

[22] Filed: Apr. 19, 1982

[30] Foreign Application Priority Data

May 25, 1981 [AT] Austria ................................. 2345/81

[51] Int. Cl.³ .......................... G11B 5/56; G11B 21/24
[52] U.S. Cl. ....................................... 360/109; 360/84; 360/104
[58] Field of Search .......................... 360/109, 104–106, 360/84, 77, 75

[56] References Cited

U.S. PATENT DOCUMENTS

| 3,373,248 | 3/1968 | Baybick et al. | 360/109 |
| 3,978,522 | 8/1976 | Rothlisberger | 360/109 X |
| 4,056,518 | 11/1977 | Milovac | 360/106 |
| 4,086,638 | 4/1978 | Saito | 360/109 |
| 4,117,522 | 9/1978 | Whittle et al. | 360/109 |
| 4,255,771 | 3/1981 | Kubota | 360/107 X |
| 4,329,724 | 5/1982 | Clayton | 360/109 |
| 4,340,918 | 7/1982 | Jansen | 360/109 |
| 4,340,919 | 7/1982 | Kato | 360/109 |

FOREIGN PATENT DOCUMENTS

| 2527139 | 12/1976 | Fed. Rep. of Germany | 360/109 |
| 2092357 | 8/1982 | United Kingdom | 360/109 |
| 497632 | 3/1976 | U.S.S.R. | 360/109 |

Primary Examiner—John H. Wolff
Attorney, Agent, or Firm—David R. Treacy

[57] ABSTRACT

A drum-shaped scanning device (12) for a magnetic tape (2) comprises at least one rotatable head mount (42, 43) which comprises a planar mounting portion (44, 45) and a planar carrier portion (46, 47) for supporting a magnetic head (34, 35) which is disposed symmetrically relative to a radial line (38, 39) through the axis of rotation (24) of the head mount, the mounting portion and the carrier portion being integrally connected by at least one flexible strip-shaped connecting member (56, 57, 58, 59) which extends in the same direction as the radial line and which is deformable to permit adjustment of the carrier portion relative to the mounting portion in order to adjust the position of the magnetic head. The connecting member (56, 57, 58, 59) is bent into a U-shape about a bending axis (60, 61) which extends perpendicularly to said radial line and is parallel to the planes of the mounting portion and the carrier portion, which planes are perpendicular to the axis of rotation (24), the mounting portion (44, 45) and the carrier portion (46, 47) being interconnected by said connecting member at their edges which are remote from the circumferential surface (21), so that said portions are situated above one another and are resiliently biased relative to each other. An adjusting device (62, 63) which bears against the mounting portion (44, 45) acts on the carrier portion (46, 47) in order to adjust the carrier portion in a direction parallel or substantially parallel to the axis of rotation. For adjusting the carrier portion (46, 47) perpendicularly to the axis of rotation (24) said portion comprises at least one contact surface (70, 71, 78, 79, 73, 80, 81) for a further adjusting device (86) which bears against at least one abutment surface (74, 75, 82, 83, 76, 77, 84, 85) on the mounting portion (44, 45).

18 Claims, 6 Drawing Figures

DRUM-SHAPED SCANNING DEVICE

BACKGROUND OF THE INVENTION

The invention relates to a drum-shaped scanning device for a recording and/or reproducing apparatus for a magnetizable record carrier in the form of a tape, which record carrier can be wrapped at least partly around the circumferential surface of the scanning device, the device comprising at least one rotatable one-piece head mount for a magnetic head or heads for scanning the record carrier wrapped around the circumferential surface. Such apparatus will be referred to hereinafter as a rotary tape-scanning apparatus. In known apparatus of this type the head or heads is or are arranged substantially symmetrically relative to a radial line through the axis of rotation of the head mount, the latter comprising a planar mounting portion for mounting said head or heads on the scanning device and a planar carrier portion for carrying the magnetic head or heads, which carrier portion is connected to the mounting portion by at least one flexible strip-shaped connecting member which functions as an integral hinge, which extends substantially in the same direction as said radial line, and which is deformable for adjustment of the carrier portion relative to the mounting portion the planes of the mounting portion and the carrier portion extending substantially perpendicularly to the axis of rotation, and an adjusting device, which bears against an abutment, acting on the carrier portion for adjusting this portion relative to the mounting portion in the axial direction. The phase "in the axial direction" is to be understood to mean in a direction parallel or substantially parallel to the axis of rotation of the head mount.

Such a scanning device is known from, for example, U.S. Pat. No. 4,117,522. This known scanning device comprises a disc-shaped head mount having one mounting portion and four carrier portions, one for each magnetic head, as well as members which integrally interconnect the mounting portion and the carrier portions. The connecting members and the carrier portions are disposed in one plane, so that the head mount requires a comparatively large amount of space. However, this is unfavourable for the construction of scanning devices of small diameter, as are required for equipment having small dimensions and a high storage capacity. In this known scanning device each carrier portion is integrally connected to the mounting portion by three strip-shaped connecting members. One of the connecting members extends in the direction of the radial line and each carrier portion is adjustable relative to the mounting portion via this connecting member by means of two set-screws for adjusting the azimuth position of the magnetic head which is secured to the carrier portion. The other two connecting members extend perpendicularly to the direction of the relevant radial line and each carrier portion is adjustable relative to the mounting portion via these two connecting members by means of a set-screw for adjusting the axial position, i.e., the position in the axial direction, of the magnetic head which is secured to the carrier portion. However, it is then essential that the normal distance between the magnetic head and the connecting members which extend perpendicularly to the radial line is as large as possible in order to ensure that the adjusting movement of the carrier portion during adjustment of the axial position of the magnetic head does not adversely affect the inclined position of the magnetic head, which, as is known, should be such that the magnetic-head co-operates with a record carrier scanned by said head with its entire head face. As in this known scanning device the mounting portion, the connecting members and the carrier portion of the head mount are disposed in one plane, said normal distance can only be comparatively small.

SUMMARY OF THE INVENTION

It is the object of the invention to provide a simple and inexpensive solution to the said problem and to provide a drum-shaped scanning device of the type mentioned in the opening paragraph, which device has a small diameter, which comprises a particularly simple head mount, and which in particular provides a large range of adjustment of the axial position of the magnetic head without adversely affecting the inclined position of the magnetic head by said adjustment. To this end the invention is characterized in that the connecting member is bent into a U-shape about a bending axis which extends parallel to the planes of the mounting portion and the carrier portion and substantially perpendicularly to said radial line, said connecting member interconnecting the mounting portion and the carrier portion at their edges which are remote from the circumferential surface of the scanning device and keeping them resiliently biassed relative to each other in the axial direction with their major surfaces situated above one another in the axial direction.

The U-shape of the connecting member ensures that the planes of the mounting portion and the carrier portion of the head mount are disposed above one another in the axial direction, which yields several advantages with respect to the construction and adjustment. For example, the dimensions of the head mount are reduced, which enables the overall diameter of the drum-shaped scanning device to be reduced. Since the U-shaped connecting member, which functions as an integral hinge, interconnects the mounting portion and the carrier portion at their edges which are remote from the circumferential surface of the scanning device, a maximum normal distance is obtained between the connecting member and the magnetic head, which is arranged on the carrier portion near the circumferential surface of the scanning device, so that the adjusting movement of the magnetic head for its adjustment in the axial direction hardly influences the inclined position of the magnetic head. Since the connecting member elastically biasses the mounting portion and the carrier portion relative to each other in the axial direction the carrier portion can simply be adjusted either away from or towards the mounting portion by actuating the adjusting device accordingly, permitting a repeated adjustment in opposite directions. Such an U-shaped construction of the connecting member also permits a simple azimuth adjustment of a magnetic head arranged on the carrier portion when an adjusting device is provided which acts on the carrier portion asymmetrically relative to the relevant radial line.

For the adjusting device which acts on the carrier portion a separate abutment may be arranged on the mounting portion, for example, by means of screws or rivets, on which abutment the adjusting device is adjustably arranged. This is for example also the case with the known scanning device, which comprises a carrying arm for set-screws on the mounting portion, the free end of said arm extending up to the carrier portion.

Securing the separate abutment to the mounting portion demands an additional operation during which the mounting portion may become misaligned and deformed, which adversely affects the accuracy, dimensional stability and dimensional accuracy of the head mount. Therefore, it is found to be particularly advantageous if the mounting portion directly constitutes the abutment for the adjusting device which acts on the carrier portion. As the U-shaped connecting member ensures that the mounting portion and the carrier portion of the head mount remain disposed above one another, the mounting portion may simply be used as abutment for the adjusting device which acts on the carrier portion, so that it is no longer necessary to provide a separate abutment and to mount it on the mounting portion. The mounting portion itself may, for example, be formed with a threaded bore into which can be fitted a set-screw which serves as the adjusting device. Alternatively, the adjusting device may be an adjusting wedge which is movably guided directly on the mounting portion.

By means of the adjusting device the position of the magnetic head of the scanning device can be adjusted in the axial direction, as stated in the foregoing. However, in order to guarantee correct recording and/or reproduction by the magnetic head of the scanning device, it is effective to provide an adjustment of the position of the magnetic head in at least one direction which is perpendicular to the axis of rotation in addition to the adjustment of its position in the axial direction. In the known scanning device such an adjustment is not possible because of the arrangement of the mounting portion, the connecting members and the carrier portion of the head mount in one plane. However, in the scanning device in accordance with the invention the U-shaped connecting member also permits adjustment in a direction perpendicular to the axis of rotation, so that an adjustment of the carrier portion relative to the mounting portion in at least one direction within the plane of the carrier portion is readily possible. Therefore it is found to be advantageous if the carrier portion comprises at least one contact surface, and the mounting portion comprises at least one abutment surface, for at least one further adjusting device for adjusting the carrier portion relative to the mounting portion in at least one direction within the plane of the carrier portion. Thus, in addition to the position of the carrier portion relative to the mounting portion in the axial direction, the position of the carrier portion with the magnetic head arranged on it can be adjusted simply and easily in at least one direction within the plane of the carrier portion, that is, perpendicular to the axis of rotation.

It is then found to be advantageous if the carrier portion comprises two substantially confronting contact surfaces, and the mounting portion comprises two substantially opposed abutment surfaces, for at least one further adjusting device for adjusting the carrier portion relative to the mounting portion in directions within the plane of the carrier portion and perpendicular to said radial line. This permits a simple adjustment of the position of the magnetic head on the carrier portion relative to the cylindrical surface of the scanning device in two opposite circumferential directions. This is of particular importance for a scanning device comprising at least two magnetic heads arranged at uniform angular distances from each other, because it enables the angular distances between the magnetic heads in the circumferential direction, that is, the circumferential position of the magnetic heads, to be adjusted exactly, which is essential for correct recording and/or play-back.

For an additional adjustment of the position of the magnetic head of the scanning device it is also found to be advantageous if the carrier portion comprises two further substantially opposed contact surfaces, and the mounting portion comprises two further substantially opposed abutment surfaces, for at least one further adjusting device for adjusting the carrier portion relative to the mounting portion in directions within the plane of the carrier portion which coincide with said radial line. This enables the position of the magnetic head relative to the circumferential surface of the scanning device to be adjusted simply in two opposite radial directions also. This is important because this adjustment of the radial position of the magnetic head makes it possible to optimize the distance between the magnetic head and the record carrier which is scanned by said head and which is wrapped at least partly around the circumferential surface of the scanning device, which is also important for correct recording and/or reproducing.

The contact surfaces on the carrier portion and the abutment surfaces on the mounting portion may be constituted by offset tabs, recessed grooves or projecting ridges, which co-operate with the relevant further adjusting device, which may, for example, comprise set-screws or adjusting wedges. However, it is found to be advantageous if the carrier portion and the mounting portion are each formed with a hole, which holes are aligned with each other in a direction parallel or substantially parallel to the axis of rotation, and into which holes a pin-shaped adjustment tool can be inserted in the axial direction, which tool serves as further adjusting device and, for adjusting the carrier portion relative to the mounting portion in at least one direction within the plane of the carrier portion, is manually pivotable, the adjustment tool, as it is pivoted, acting on a contact surface formed by a portion of the bounding wall of the hole in the carrier portion while bearing against an abutment surface formed by a portion of the bounding wall of the hole in the mounting portion. This results in a particularly simple construction not only for the contact surfaces and the abutment surfaces but also for the further adjusting device for adjusting the position of the magnetic head. The holes in the carrier portion and mounting portion may, for example, be of square or rectangular shape thus providing adjustment of the carrier portion in two mutually perpendicular directions within the plane of the carrier portion. Alternatively, the holes may be of circular shape, thereby providing simple adjustment of the carrier portion in arbitrary directions within the plane of the carrier portion. The holes of circular shape in the mounting portion and the carrier portion may have equal diameters, they may alternatively have different diameters.

The member which integrally connects the carrier portion to the mounting portion may be elastically deformable in at least one direction within the plane of the carrier portion for adjusting this portion relative to the mounting portion, after which adjustment the carrier portion is fixed in its adjusted position, for example, by screws or by glueing. However, it is found to be particularly advantageous, if the connecting member is plastically deformable within the adjustment range for adjusting the carrier portion relative to the mounting portion in at least one direction within the plane of the carrier portion. This ensures that the carrier portion remains in its adjusted position as a result of the plastic deformation of the connecting member, without a separate fixing being necessary. The plastic deformability of the connecting member within its adjustment range, which range is comparatively small in practice, is obtained by a suitable choice of the material of the connecting member and thus of the one-piece head mount. It is advantageous to use, for example, soft-annealed brass; it is alternatively possible to employ steel with a low elastic limit.

The mounting portion and the carrier portion may be interconnected by a single connecting member, which may be arranged symmetrically or asymmetrically relative to the relevant radial line. However, it is found to be particularly advantageous if two connecting members are provided which are spaced from each other along the bending axis and which are disposed symmetrically on opposite sides of said radial line. This guarantees a particularly stable connection between the carrier portion and the mounting portion, which is of advantage for a reliable and correct mounting of the magnetic head on the scanning device. The symmetrical arrangement of the two connecting members also ensures that the forces exerted in opposite directions during adjustment of the carrier portion relative to the mounting portion are the same.

Two embodiments of the invention will be described in more detail, by way of example, with reference to the drawings.

DESCRIPTION OF THE PREFERRED EMBODIMENT

Figure 1:
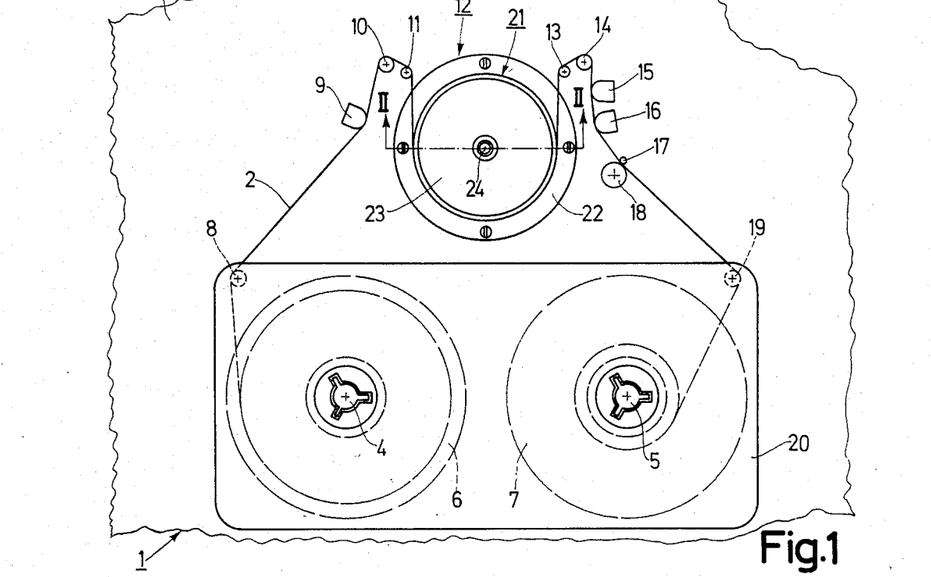
FIG. 1 is a schematic plan view of a part of a recording and/or reproducing apparatus for a record-carrier in the form of a tape accommodated in a cassette, which tape in partly wrapped around a two-part drum-shaped scanning device in accordance with a first embodiment of the invention.

FIG. 1 schematically represents a part of a recording and/or reproducing apparatus 1 for recording and/or reproducing video and audio information on a magnetizable record carrier 2 which is in the form of a tape and is hereinafter referred to as such. The apparatus 1 comprises a deck plate 3 which carries a supply mandrel 4 and a take-up mandrel 5, which mandrels serve to drive a supply reel 6 and a take-up reel 7 respectively which can be fitted on the corresponding winding mandrels 4 and 5. Between the winding reel 6 and the take-up reel 7 the tape 2 passes round a pin-shaped tape guide 8 for diverting the tape, over a magnetic erase head 9 for erasing all the information stored on the tape, round two further pin-shaped tape guides 10 and 11 for diverting the tape, round a drum-shaped scanning device 12, which will be described in more detail hereinafter, round two further pin-shaped tape guides 13 and 14 for diverting the tape, over a magnetic erase head 15 for erasing audio information, over a magnetic recording and/or playback head 16 for recording and/or reproducing audio information, over a capstan 17 which, in conjunction with a pressure roller 18 which can be pressed against the capstan in a manner not shown, provides a uniform tape transport during recording and/or reproducing, and round a further pin-shaped tape guide 19 for diverting the tape 2. The supply reel 6, the tape-up reel 7 and the two tape guides 8 and 19 are arranged in a cassette 20, which is represented schematically. By means of a device which can be set to two operating positions, which device may, for example, comprise the tape guides 10 and 11 and the tape guides 13 and 14, the tape can be extracted from the cassette and laid on the elements 9, 12, 15, 16 and 17. This is not shown in more detail because it is irrelevant to the present invention.

As is customary in such equipment, the tape 2 is helically wrapped around the cylindrical surface 21 of the drum-shaped scanning device 12 through an angle of approximately 180°. The scanning device and also the tape guides 11 and 13 are inclined relative to the deck plate 3, but for the sake of simplicity this is not shown in FIG. 1. At least one rotatable magnetic head, which serves for recording and/or reproducing video information and which is arranged on the scanning device 12, co-operates with the tape 2 wrapped around the cylindrical surface 21 of the scanning device 12 and scans the tape along information tracks which are inclined relative to the longitudinal direction of said tape.

Figure 2:
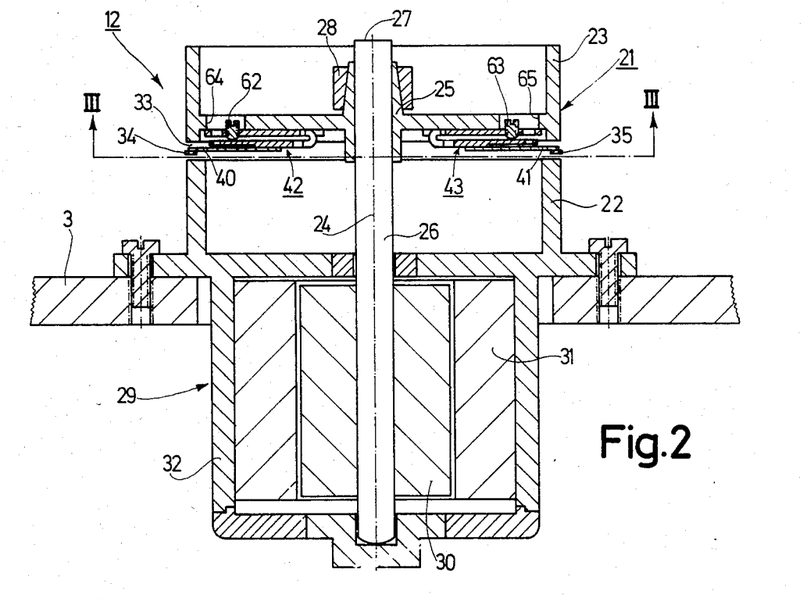
FIG. 2 is a sectional view taken on the line II—II in FIG. 1, of the scanning device in the apparatus shown in FIG. 1.

As can be seen in FIG. 2 the drum-shaped scanning device 12 in the present embodiment comprises a stationary drum half 22 and a drum half 23 which is coaxial with the stationary drum half and is rotatable about an axis 24. The rotary drum half 23 comprises a hub 25 mounted on the free end 27 of a shaft 26 which is rotatable about the axis 24. For this purpose the hub 25 has a hollow cylindrical sleeve-shaped portion which tapers externally towards the free end 27 of the shaft 26 and onto which is slid a self-locking clamping ring 28 which, in order to secure the drum half 23 to the shaft 26, clamps the sleeve-shaped portion of the hub 25 onto the shaft 26. The shaft 26, and thus the drum half 23, is driven directly by a motor 29 which is represented schematically and the rotor 30 of which is coaxially mounted on and connected to the shaft 26. The stator 31 of the motor 29 is accommodated in a motor housing 32, which forms a unit with the stationary drum half 22. In this way the motor 29 and the entire drum-shaped scanning device 12 constitute a simple, easy-to-mount constructional unit. It is to be noted that in the present case the circumferential surface 21 of the scanning device 12 comprises the two cylindrical circumferential surfaces of the two drum halves 22 and 23, the circumferential surface 21 being divided by a gap 33 formed between the two drum halves 22 and 23.

On the rotatable drum half 23 of the scanning device 12 two magnetic heads 34 and 35 are arranged, whose head faces 36 and 37, in which the head gaps are formed, project from the gap 33 formed between the two drum halves 22 and 23 in order to co-operate with the tape 2 wrapped around the circumferential surface 21. As is apparent from FIGS. 3 and 4, the two magnetic heads 34 and 35 are situated at the same level perpendicular to the axis of rotation 24 and are uniformly spaced from each other in the circumferential direction of the drum half 23, so that the angular distance between the two magnetic heads is 180°. Each magnetic head 34 or 35 respectively is arranged symmetrically relative to a radial line 38 or 39 respectively through the axis of rotation 24 and is cemented onto a schematically represented, piezo-electrically controllable bimorph-strip element 40 or 41 respectively by means of which, through the application of appropriate control signals, the magnetic head arranged on the respective element can be deflected out of a rest position between two extreme positions in the axial direction, i.e. a direction parallel or substantially parallel to the axis of rotation 24, in order to ensure accurate tracking of an information track to be scanned on the tape 2. Such a measure is known and is not described in more detail because it is irrelevant to the present invention.

Figure 3:
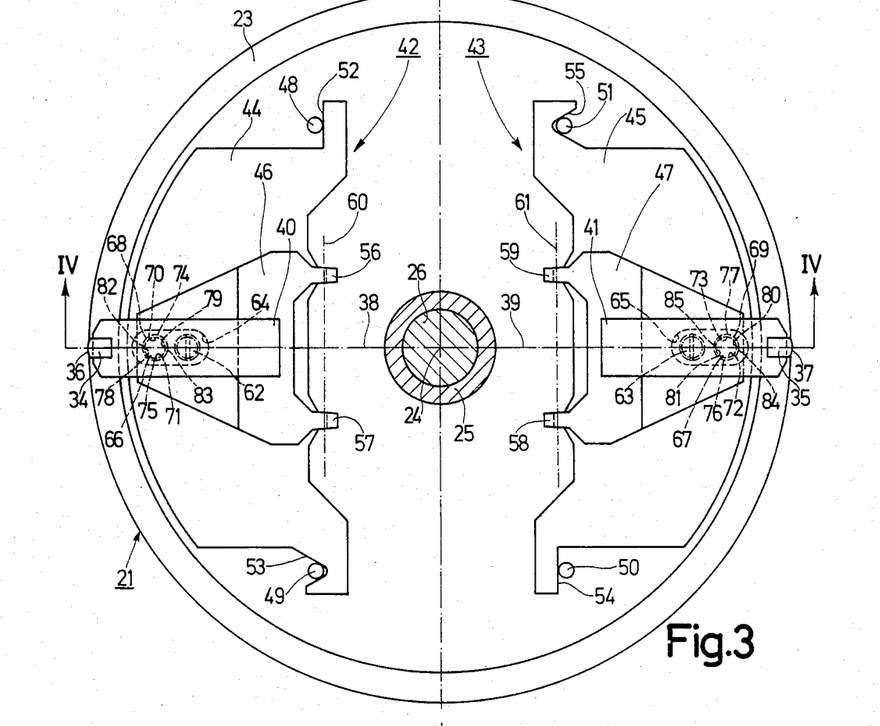
FIG. 3 is a sectional view, taken on the line III—III in FIG. 2, of the rotary part of the scanning device shown in FIG. 2.
Figure 4:
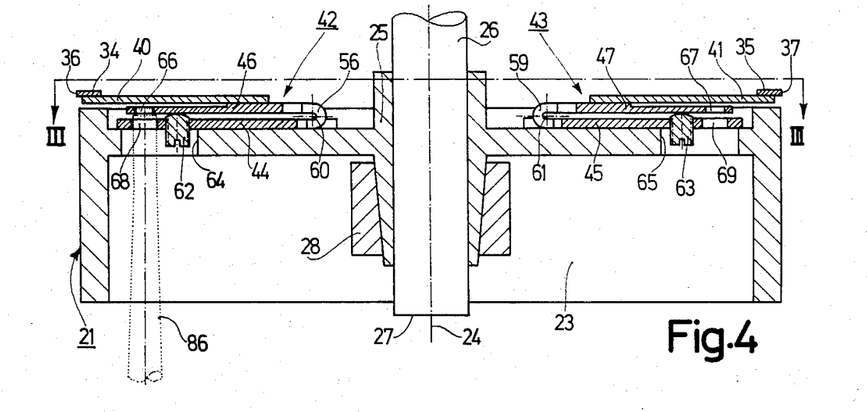
FIG. 4 shows the rotary part of the scanning device of FIG. 2 in a sectional view taken on the line IV—IV in FIG. 3.

For mounting each magnetic head 34 or 35 on the rotary drum half 23 the scanning device 12 comprises a one-piece head mount 42 or 43 respectively which for mounting on the scanning device 12 comprises a planar mounting portion 44 or 45 respectively which is glued to the drum half 23, and for carrying the respective magnetic head 34 or 35 comprises a planar carrier portion 46 or 47 respectively, the planes of the mounting portions and the carrier portions being substantially perpendicular to the axis of rotation 24. For positioning each of the two one-piece head mounts 42 and 43 on the rotary drum half 23, this drum half comprises two locating pins 48, 49 and 50, 51 respectively, which cooperate with locating surfaces 52, 53 and 54, 55 respectively on the respective mounting portions 44 and 45 of the head mounts 42 and 43 respectively. The locating surfaces 53 and 55 are V-shaped and the locating surfaces 52 and 54 are straight, which ensures a correct positioning of each head mount 42 or 43 on the dram half 23. Positioning is effected in such a way that the magnetic head 34 or 35 carried by each head mount is disposed symmetrically relative to the respective radial line 38 or 39 through the axis of rotation 24, as already stated in the foregoing. Each magnetic head 34 or 35 is carried on the respective carrier portion 46 or 47 via the respective strip element 40 or 41, the strip element 40 or 41 being cemented onto the carrier portion. In the present case each carrier portion 46 or 47 is integrally connected to the respective mounting portion 44 or 45 by two flexible strip-shaped connecting members 56 and 57 or 58 and 59 respectively which function as deformable integral hinges.

The respective connecting members 56 and 57 or 58 and 59 of each mount 42 or 43 are each bent into a U-shape about a bending axis 60 or 61 respectively, which is schematically represented by dash-dot lines in FIGS. 3 and 4 and which is parallel to the planes of the respective mounting portion 44 or 45 and the respective carrier portion 46 or 47 and perpendicular to the respective radial line 38 or 39. The strip-shaped connecting members 56 and 57 or 58 and 59 are arranged with their limbs extending substantially parallel to each other and in the same direction as the respective radial line 38 or 39, are spaced from each other along the bending axis 60 or 61 respectively and are disposed symmetrically on opposite sides of the respective radial line 38 or 39. The members 56 and 57 or 58 and 59 integrally interconnect the mounting portion 44 or 45 respectively and the carrier portion 46 or 47 respectively of each head mount 42 or 43 at the edges of said portions which are remote from the circumferential surface 21 of the scanning device 12 and keep the mounting portion and carrier portion of each head resiliently biassed towards each other in the axial direction with their major surfaces disposed above one another in the axial direction. This is achieved by pre-stressing the connecting members in their bent positions. Since the mounting portion and the carrier portion of each head mount are disposed above one another, the head mounts construction can be very compact, so that they occupy a minimal space.

Each carrier portion 46 or 47 is adjustable relative to the respective mounting portion 44 or 45 by deformation of the respective connecting members 56 and 57 or 58 and 59. For adjusting the carrier portion together with the magnetic head 34 or 35 mounted on it relative to the mounting portion in the axial direction, an adjusting device in the form of a set-screw 62 or 63 with a rounded end acts on the respective carrier portion 46 or 47. The set-screw 62 or 63, which extends parallel to the axis of rotation 24 and which is disposed symmetrically relative to the respective radial line 38 or 39, is accessible for adjustment from the free end 27 of the shaft 26 of the scanning device 12 via a slot 64 of 65 respectively formed in the rotary drum half 23. The reaction on the set-screw 62 or 63 from the carrier portion 46 or 47 respectively is taken by an abutment which is constituted directly by the mounting portion 44 or 45 respectively. For this purpose each mounting portion is formed with a threaded bore, into which the set-screw is screwed. The set-screw has a fine screw thread for fine-adjustment of the carrier portion in the axial direction. In addition to the fine adjustment the fine screwthread has the advantage that the set-screw, under the influence of the bias of the carrier portion against the rounded end of the set-screw, is self-locking in the threaded bore in the mounting portion, thereby precluding inadvertent rotation.

By turning each set-screw 62 or 63 the respective carrier portion 46 or 47 co-operating therewith, together with the magnetic head 34 or 35 mounted on the carrier portion, can be adjusted relative to the mounting portion 44 or 45 respectively in the axial direction. When the set-screw 62 or 63 is turned the respective connecting members 56 and 57 or 58 and 59, which are pre-stressed to keep the mounting portion and the carrier portion biassed towards each other, are elastically deformed in the axial direction and either increase or reduce the curvature of their bends depending on the direction in which the set-screw is turned. Thus, each pair of connecting members 56, 57 or 58, 59 constitutes a pivotal bearing arrangement whereby the respective carrier portion 46 or 57 is pivotable relative to the respective mounting portion 44 or 45 in the axial direction. When either the set-screw is turned in one direction the respective carrier portion is adjusted in the axial direction away from the respective mounting portion, and when the set-screw is turned in the opposite direction the carrier portion is moved towards the mounting portion under the influence of the respective pair of resiliently pre-stressed connecting members. Through these adjustments of the carrier portion relative to the mounting portion in the axial direction, the set-screw provides a simple adjustment of the axial position of each magnetic head 34 or 35, which as is shown in FIG. 3 is situated at a maximum disttance from the pivotal bearing arrangement constituted by the respective pair of connecting members. Each magnetic head 34 or 35 should occupy a specific rest position in the axial direction relative to the rotary drum half 23 when the respective piezo-electric strip element 40 or 41 receives no control signal, in order to guarantee correct recording and/or reproducing by the scanning device 12. The large distance between each magnetic head 34 or 35 and the connecting members 56 and 57 or 58 and 59 respectively of the respective head mount 42 or 43 carrying said magnetic head, which members constitute the pivotal bearing arrangement for the respective carrier portion 46 or 47 when this portion is adjusted in the axial direction results in a large adjustment radius which ensures that this adjustment, which in practice is at the most some tens of millimeters, does not change the inclined position of the respective magnetic head 34 or 35, which position should always be such that the entire head face 36 or 37 of the relevant magnetic head co-operates with the tape. This is the case if the magnetic head 34 or 35 is always substantially disposed in a plane perpendicular to the axis of rotation, as is shown in FIG. 4.

In practice it is found that for correct recording and/or reproducing it does not always suffice to adjust the axial position of the magnetic heads 34 and 35, i.e. the position along an axis parallel or substantially parallel to the axis of rotation 24 of the scanning device 12; it is advantageous to adjust also the position of each magnetic head in a plane perpendicular to the axis of rotation.

Owing to the U-shape of the members 56, 57 and 58, 59 these members are readily deformable also in directions perpendicular to the axis of rotation, so that by means of a small force the carrier portion 46 or 47 can be simply adjusted relative to the mounting portion 44 or 45 respectively in at least one direction within the plane of the carrier portion. For this purpose, as can be seen in FIGS. 3 and 4, circular holes 66 or 67 and 68 or 69 respectively, are formed in the carrier portion 46 or 47 respectively and the mounting portion 44 or 45 respectively of each head-mount 42 or 43 respectively, the two holes in each head mount being aligned with each other in a direction of parallel or substantially parallel to the axis of rotation and each being disposed symmetrically relative to the radial line 38 or 39 respectively. The hole 66 or 67 in each carrier portion has a smaller diameter than the hole 68 or 69 respectively in the associated mounting portion. Those two portions 70 and 71 or 72 and 73 of the bounding wall of the respective hole 66 or 67 in the carrier portion 46 or 47 respectively at which planes tangential to the respective wall extend parallel to the radial line 38 or 39 respectively, constitute two opposed contact surfaces, and those two portions 74 and 75 or 76 and 77 of the bounding wall of the hole 68 or 69 respectively in the respective mounting portion 44 or 45, at which planes tangential to the respective wall also extend parallel to the respective radial line 38 or 39, constitute two opposed abutment surfaces, for a further adjusting device for adjusting the respective carrier portion 46 or 47 relative to the mounting portion 44 or 45 respectively in directions within the plane of the carrier portion and perpendicular to the radial line 38 or 39. Those two portions 78 and 79 or 80 and 81 of the bounding wall of the respective hole 66 or 67 formed in the respective carrier portion 46 or 47, at which planes tangential to the respective wall extend perpendicularly to the radial line 38 or 39 respectively, constitute two further opposed contact surfaces, and those two portions 82 and 83 or 84 and 85 of the bounding wall of the hole 68 or 69 respectively in the mounting basic portion 44 or 45 respectively, at which planes tangential to the respective wall also extend perpendicularly to the respective radial line 38 or 39, constitute two further opposing abutment surfaces, for a further adjusting device for adjusting the respective carrier portion 46 or 47 relative to the mounting portion 44 or 45 respectively in directions within the plane of the carrier portion which coincide with the respective radial line 38 or 39.

In the present case a pin-shaped adjustment tool 86 serves as a further adjusting device for adjusting each carrier portion 46 or 47 relative to the mounting portion 44 or 45 respectively in directions within the plane of the carrier portion. The adjustment tool can be inserted in the axial direction into the holes 68 and 66 or 69 and 67 respectively from the side of the drum half 23 which is nearer the free end 27 of the shaft 26 of the scanning device 12, as is indicated by the dotted lines in FIG. 4. At its end which co-operate with the holes the adjustment tool is stepped in conformity with the different diameters of the aligned holes. When the adjustment tool is inserted into the holes 68 and 66 or 69 and 67 respectively, the shoulder formed by the stepped portion of the tool abuts the major surface of the respective carrier portion 46 or 47 which faces the mounting portion 44 or 45, respectively, so that the penetration depth of the adjustment tool 68 in the axial direction is limited. This prevents the adjustment tool being inserted too far into the holes and possibly damaging the strip element 40 or 41 which extends over the respective hole 66 or 67 in the carrier portion 46 or 47 respectively. If the holes 68 and 66 and 69 and 67 all have equal diameters, the adjustment tool may be stepped in such a way that it abuts that major surface of the mounting portion which is remote from the carrier portion, so that the penetration depth of this adjusting tool in the axial direction is again limited.

For adjusting each carrier portion 46 or 47 relative to the respective mounting portion 44 or 45 in a direction within the plane of the carrier portion the adjustment tool 86 is simply tilted manually so that its end remote from the carrier portion moves in direction opposite to the derived direction of adjustment of the carrier portion. When the adjustment tool 86 is thus tilted its stepped end acts on a wall portion of the hole 66 or 67 in the carrier portion 46 or 47 respectively which serves as a contact surface, while bearing against a wall portion of the hole 68 or 69 in the respective mounting portion 44 or 45 which serves as an abutment surface. By tilting the adjustment tool 86 in a direction perpendicular to the radial line 38 or 39 the respective carrier portion 46 or 47 can be adjusted relative to the mounting portion 44 or 45 respectively in an opposite direction which is perpendicular to the respective radial line within the plane of the carrier portion, thus effecting adjustment of the position of the magnetic head 34 or 35 respectively in a tangential direction relative to the cylindrical surface 21 of the scanning device 12. During such an adjustment the adjustment tool 86, depending on the direction in which it is tilted, acts on one of the portions 70, 71 or 72, 73 respectively of the bounding wall of the hole 66 or 67 respectively in the carrier portion 46 or 47 respectively while bearing against one of the portions 74, 75 or 76, 77 respectively of the bounding wall of the respective hole 68 or 69 in the mounting portion 44 or 45 respectively. The symmetrical arrangement of the connecting members 56 and 57 and of the connecting members 58 and 59 relative to the respective radial line 38 and 39 ensures that equal forces are applied for adjustments in opposite directions, which is achieved by the symmetry of forces. By tilting the adjustment tool 86 in a direction which coincides with the radial line 38 or 39 the carrier portion 46 or 47 respectively can be adjusted relative to the mounting portion 44 or 45 respectively in an opposite direction which coincides with the respective radial line within the plane of the carrier portion, thereby effecting radial adjustment of the position of the respective magnetic head 34 or 35 relative to the circumferential surface 21 of the scanning device 12. During such an adjustment the adjustment tool 86, depending on the direction in which it is tilted, acts on one of the portions 78, 79 or 80, 81 respectively of the bounding wall of the respective hole 66 or 67 in the carrier portion 46 or 47 respectively while bearing against one of the portions 82, 83 or 84, 85 respectively of the bounding wall of the respective hole 68 or 69 in the mounting portion 44 or 45 respectively. Also during this adjustment a symmetry of forces is obtained because of the symmetrical arrangement of the connecting members 56 and 57 and of the connecting members 58 and 59 relative to the radial line 38 and 39 respectively.

In the manner described in the foregoing it is possible to adjust the circumferential position of the magnetic head 34 or 35 in a tangential direction relative to the circumferential surface 21 of the scanning device 12 and the radial position of each magnetic head in a radial direction relative to the circumferential surface 21. Thus, it is possible to ensure in a simple manner that the magnetic heads are accurately spaced from each other by the same angle, which is exactly 180° in the present case, and that in the radial direction the magnetic heads project by exactly the same distance from the circumferential surface 21 of the scanning device 12 with their head faces 36 and 37 in which the head gaps are formed, in order to achieve a uniform and consequently an optimum contact with the tape 2 which is wrapped around the circumferential surface 21. By means of these two adjustments in directions which are perpendicular to each other, which adjustments are possible in addition to the adjustment of the axial position of the magnetic heads, correct recording and/or reproducing by the magnet heads of the scanning device is achieved.

During adjustment of the carrier portion 46 or 47 relative to the respective mounting portion 44 or 45 in directions within the plane of the carrier portion, the connecting members 56 and 57 or 58 and 59 respectively which connect the carrier portion integrally to the mounting portion, are also deformed but in a different manner from that of their deformation during adjustment of the position of the respective magnetic head 34 or 35 in the axial direction by means of the respective set-screw 62 or 63. When the carrier portion is adjusted relative to the mounting portion in directions within the plane of the carrier portion the connecting members 56 and 57 or 58 and 59 are subjected to plastic deformation over their adjustment range. The plastic deformability of the connecting members is obtained by a suitable choice of the material of said members and thus of the head mounts 42 and 43. It is found that for this purpose it is effective to use, for example, soft-annealed brass, which has a particularly low elastic limit, but it is alternatively possible to employ steel with low elasticity limit. The plastic deformation of the connecting members 56 and 57 or 58 and 59 of each head mount 42 or 43 respectively over their adjustment range during adjustment of the respective carrier portion 46 or 47 relative to the mounting portion 44 or 45 respectively in directions within the plane of the carrier portion ensures that after such an adjustment the respective connecting members, which have been subject to plastic deformation, automatically maintain the respective carrier portion 46 or 47 in its adjusted position, so that no separate fixing of the carrier portion in its adjusted position is required, as will be apparent from FIGS. 3 and 4.

As is apparent from the foregoing, the scanning device comprises head mounts of simple construction for mounting the magnetic heads. Since the connecting members are U-shaped and the carrier portion and the mounting portion of each head mount are situated above each other in the axial direction, the head mounts can be of compact construction, so that they occupy a minimal space. This results in a scanning device of small diameter, as is necessary for a compact recording and-/or reproducing apparatus with a high storage capacity. The U-shaped connecting members of each head mount connect the carrier portion to the mounting portion at their edges which are remote from the circumferential surface of the scanning device, that is to say, at a maximum distance from the magnetic head which is mounted on the carrier portion and which is situated at the circumferential surface. Since the connecting members constitute a pivotal bearing arrangement for the carrier portion carrying the magnetic head, a maximum adjustment range for the magnetic head is obtained, in the axial direction in order to adjust the axial position of the magnetic head. This yields the advantage, that the displacement of the magnetic head during adjustment of its axial position hardly affects and consequently does not alter its inclined position. Due to the arrangement of the carrier portion and the mounting portion above each other the mounting portion of each head mount may be used as abutment for the adjusting device formed by the set-screw 62, 63 respectively. This is simple, saves providing a separate abutment, and eliminates certain disadvantages which may arise in mounting the separate abutment on the mounting portion. As a result of the resilient connection of the carrier portion to the mounting portion by the pre-stressed connecting members the carrier portion remains always positioned against the set-screw regardless of the direction of adjustment of the set-screw, thus permitting the carrier portion to be simply adjusted in either axial direction by means of the set-screw. Since the carrier portion is always resiliently urged against the set-screw by the pre-stressed connecting members, said portion continuously exerts a force on the set-screw, which ensures that the fine-thread set-screw is self-locking by frictional contact with the threaded bore in the mounting portion, thereby preventing an inadvertent alternation of the adjustment, so that separate locking of the set-screw is not necessary. Due to their U-shaped construction the connecting members can be deformed with a comparatively small force, also when the carrier portion is adjusted relative to the mounting portion in directions within the plane of the carrier portion, so that a simple and accurate adjustment of the position of the magnetic head in a plane perpendicular to the axis of rotation of the scanning device is possible. The symmetrical arrangement of the connecting members of each head mount relative to the associated radial line 38, 39 ensures that equal forces obtain when adjusting the position of the magnetic head in opposite directions. Forming the contact surfaces and abutment surfaces on the carrier portion mounting portion respectively by portions of the bounding walls of simple holes is very easy. Suitably, the adjustment tool can also be very simple. Both the adjustment tool for adjusting the position of the magnetic head in a direction perpendicular to the axis of rotation and the set-screw for adjusting the position of the magnetic head in the axial direction are accessible from the free end of the shaft of the scanning device, which has the advantage that adjustment is also possible in the assembled condition of the rotary drum half, that is to say, in the finished condition of the scanning device. The plastic deformation of the connecting members during an adjustment of the carrier portion relative to the mounting portion in a direction within the plane of the carrier portion has the advantage that the carrier portion is maintained in its adjusted position by the connecting members themselves without the provision of a separate fixing means.

Figure 5:
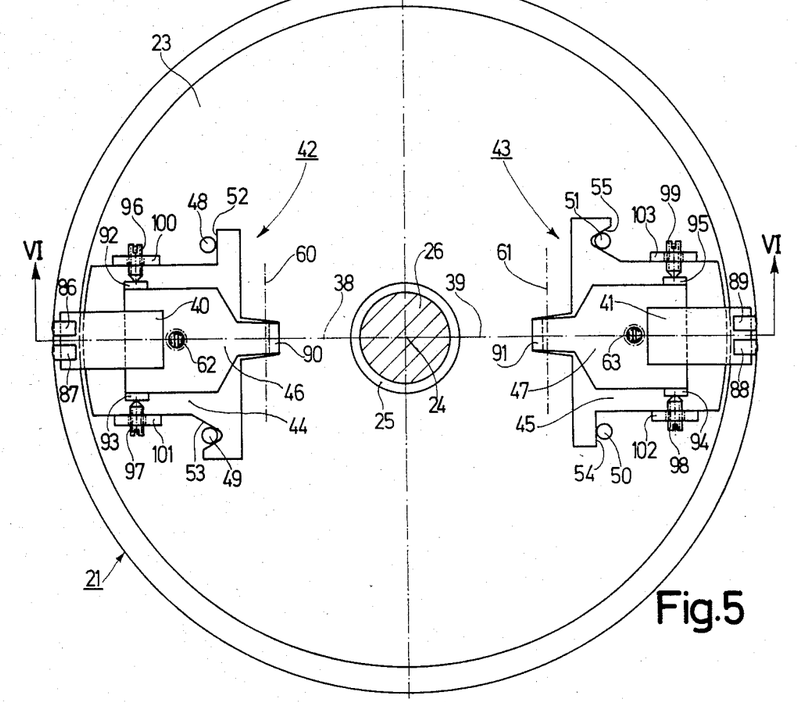
FIG. 5 is a view similar to FIG. 3 of the rotary part of a scanning device in a second embodiment of the invention.
Figure 6:
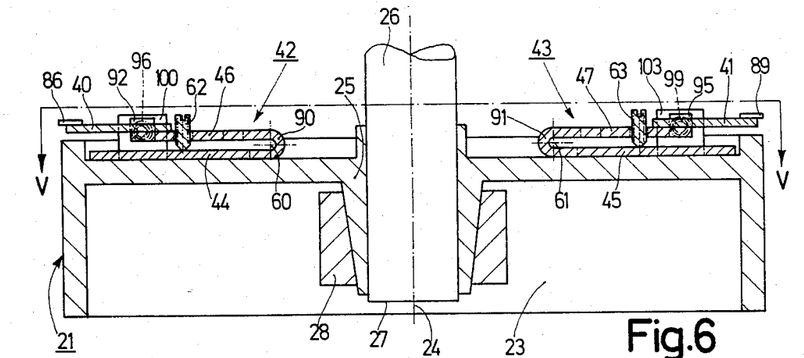
FIG. 6 shows the rotary part of the scanning device shown in FIG. 5 is a sectional view taken on the line VI—VI in FIG. 5.

FIGS. 5 and 6 show a rotary drum half 23 which again comprises two head mounts 42 and 43. Each mount, however, carries two magnetic heads 86 and 87 or 88 and 89 respectively, of which for example one head serves for recording and the other for reproducing video signals. In the same way as described for the foregoing embodiment each head mount is positioned on the drum half 23 by means of locating pins 48 and 49 or 50 and 51 respectively and locating surfaces 52 and 53 or 54 and 55 respectively. Positioning is effected in such a way that the two magnetic heads 86 and 87 or 88 and 89 respectively on each head mount are disposed substantially symmetrically relative to the respective radial line 38 or 39, the magnetic heads again being cemented onto piezo-electrically movable strip elements 40 and 41. Each strip element 40 or 41 is in turn cemented onto the respective carrier portion 46 or 47 of the head mount 42 or 43 respectively, whose mounting portion 44 or 45 respectively is cemented onto the rotary drum half 23.

The mounting portion 44 or 45 of each head mount is integrally connected to the respective carrier portion 46 or 47 by a single strip-shaped connecting member 90 or 91 which function as an integral hinge. Each connecting member is disposed symmetrically relative to the radial line 38 or 39 respectively and in this embodiment is elastically deformable in a direction within the plane of the respective carrier portion during adjustment of the carrier portion relative to the mounting portion. Each connecting member 90 or 91 is bent into a U-shape about a bending axis 60 or 61 respectively which is parallel to the planes of the mounting portion 44 or 45 respectively and the carrier portion 46 or 47 respectively and substantially perpendicular to the respective radial line 38 or 39, the limbs of said member extending substantially in the same direction as the respective radial line 38 or 39. Each connecting member 90 or 91 interconnects the mounting portion and the carrier portion of the head mount 42 or 43 respectively at the edges of said portions which are remote from the circumferential surface 21 of the scanning device 12 and keeps the mounting portion and the carrier portion resiliently biassed towards each other in the axial direction with their major surfaces disposed above one another in the axial direction.

In order to adjust the carrier portion relative to the mounting portion in the axial direction so as to adjust the axial position of the magnetic heads 86 and 87 or 88 and 89 mounted on the carrier portion, there is provided a set-screw 62 or 63 respectively which extends parallel to the axis of rotation 24 and which is disposed symmetrically relative to the respective radial line 38 or 39, the tapered end of said screw bearing against the respective mounting portion 44 or 45, which serves as an abutment for the screw. Each screw acts on the respective carrier portion 46 or 47 via a threaded bore formed in said portion, into which bore the set-screw is screwed. The set-screws 62- and 63 can be adjusted from that side of the rotary drum half 23 from which also the head mounts 42 and 43 are mounted on the drum half 23. It is obvious that in addition to each of the two set-screws 62 and 63 a further set-screw may be provided which extends in a direction parallel to the axis of rotation 24 but which is offset to one side of the respective radial line 38 or 39 so that by turning this set-screw a simple adjustment of the azimuth position of the relevant magnetic head is effected.

The carrier portion 46 or 47 respectively of each head mount 42 or 43 comprises two opposed contact surfaces which are disposed on opposite sides of the respective radial line 38 or 39. These contact surfaces are constituted by lugs 92 and 93 or 94 and 95 respectively on the respective carrier portion 46 or 47 which lugs are disposed on opposite sides of the respective radial line 38 or 39 and are associated with further adjusting devices 96 and 97 or 98 and 99 respectively for adjusting the respective carrier portion 46 or 47 relative to the mounting portion 44 or 45 respectively in directions within the plane of the carrier portion and perpendicular to the radial line 38 or 39 respectively. Each of the further adjusting devices 96, 97, 98 and 99 comprises a further set-screw, the reaction on each of these further set-screws from the respective carrier portion 46 or 47 being taken by an associated abutment surface on the mounting portion 44 or 45 respectively. The abutment surfaces on the mounting portion of each head mount 42 or 43 are constituted by lugs 100 and 101 or 102 and 103 respectively which extend perpendicularly relative to the mounting portion, in which tabs a threaded bore is formed for co-operation with the respective further set-screw. The further set-screws 96 and 97 or 98 and 99 can be adjusted from the same side of the rotary drum half 23 as the set-screws 62 and 63 for adjusting the axial position of the magnetic heads, and serve for adjusting the circumferential position of the magnetic heads.

Adjustment of the position of the magnetic heads 86 and 87 or 88 and 89 in the circumferential direction of the cylindrical surface 21 of the scanning device 12 is possible by a corresponding adjustment of the further set-screws 96 and 97 or 98 and 99 respectively. This can be effected in the following manner. The two set-screws 96 and 97 or 98 and 99 respectively which act on the carrier portion 46 or 47 respectively which is to be adjusted are initially disengaged from the lugs 92 and 93 or 94 and 96 respectively, which lugs constitute the contact surfaces, after which, for the desired adjustment by means of one of the two further set-screws which act on the relevant carrier portion, the required adjustment of the carrier portion relative to the associated mounting portion is effected by adjusting the lug on the carrier portion which cooperates with said set-screw. Once adjustment has been completed, the connecting member 90 or 91 being elastically deformed, the other one of the two further set-screws which act on the relevant carrier portion is made to contact the associated lug on the carrier portion so that this portion is maintained in its adjusted position by the two further set-screws through the two lugs which serve as contact surfaces. After adjustment, the further set-screws may be locked for example by means of glue.

As is apparent from the foregoing, the head mounts of this scanning device also are of a simple construction, the mounting portion and the carrier portion being situated one above the other in the axial direction because of the U-shape of the connecting members, which results in a very compact construction of the head mounts. In spite of this compact construction a large pivoting radius is obtained, which radius is defined by the distance between the magnetic heads on a head mount and the connecting member of the head mount. This has the advantage that the adjustment of the axial position of the magnetic heads has substantially no influence on the inclined position of the magnetic heads. Again the abutment for the axial-adjustment set-screw is constituted by the mounting portion itself. The use of two further set-screws, which act on the carrier portion in opposite directions for adjusting the carrier portion relative to the mounting portion in order to adjust the position of the magnet heads in the circumferential direction, has the advantage that said screws can also be used for fixing the carrier portion in its adjusted position and for a correct fixing of the carrier portion, so that it is virtually impossible for the adjustment of the carrier portion to be inadvertently disturbed. Since in this embodiment the connecting member can be deformed elastically for the adjustment of the carrier portion relative to the mounting portion in a direction within the plane of the carrier portion, the material used for the head mount does not have to comply with any specific requirements as regards a low limit of elasticity, so that it is also possible to use particularly cheap materials. Owing to the symmetrical arrangement of the connecting member relative to the respective radial line the forces exerted during oppositely directed adjustments are again equal.

In addition to the two embodiments described in detail several modifications are possible without departing from the scope of the invention. For example, the mounting portion and the carrier portion of a head mount may also be integrally interconnected by three U-shaped connecting members. In both embodiments the width of the connecting members, measured in a direction parallel to the respective bending axis is smaller at the bends than at the ends where they are connected to the mounting portions and carrier portions. Obviously, the connecting members may also be of constant width. A set-screw serving as an adjusting device for adjusting the carrier portion in the axial direction may also be inclined relative thereto, if this is necessary or favourable for constructional reasons. This set-screw may also be disposed asymmetrically relative to the relevant radial line, which also applies to the holes in the carrier portion and mounting portion, whose bounding wall portions constitute the contact surfaces and the abutment surfaces respectively. The contact surfaces and abutment surfaces may also be inclined relative to the relevant radial line, in which case for example, the adjustment of the position of the carrier portion relative to the mounting portion in the circumferential direction and in the radial direction is possible by means of a single adjusting operation. Instead of set-screws it is possible to employ adjustment wedges. Of course, each magnetic head may be mounted directly on the carrier portion, if no piezo-electrically adjustable strip element is used. Alternatively, more than two head mounts may be arranged on one rotary drum half for a corresponding number of magnetic heads. Furthermore, a head mount may comprise one mounting portion and two or more carrier portions which are each integrally connected to the mounting portion by at least one connecting member and which each carry at least one magnetic head. Alternatively, the mounting portion of the head mount may be constituted by the rotary drum half itself. Obviously, the scanning device may also comprise two stationary drum halves, between which a circular gap is formed through which a magnetic head arranged on a rotatable arm by means of a head mount co-operates with the record carrier which is wrapped around the circumferential surface of the two stationary drum halves. Moreover, the scanning device need not have a circular cylindrical circumferential surface; it may alternatively be elliptical, in which case the axis of rotation of the rotary head mount no longer coincides with the axis of the scanning device.

What is claimed is:

1. A rotary tape-scanning apparatus comprising:
   a drum having a circumferential cylindrical surface coaxial with an axis of rotation,
   means for wrapping a portion of a length of tape at least partly around said surface, and transporting the tape past the drum,
   at least one magnetic head,
   a one-piece head mount for mounting said head to the drum, said head mount comprising
     a planar mounting portion for fixing the mount to the drum,
     a planar carrier portion for carrying the head, arranged such that said head extends radially outward beyond said cylindrical surface, and
     at least one flexible connecting member which functions as an integral hinge and connects the carrier portion to the mounting portion such that the planes of the mounting and carrier portions extend substantially perpendicularly to said axis of rotation, said connecting member being shaped as a strip and extending substantially in a direction parallel to a radial line from said axis through the head, and
   an adjusting device including an abutment surface against which a part of the adjusting device bears, said adjusting device acting on said carrier portion for adjusting the carrier portion relative to the mounting portion in the axial direction,
   characterized in that the connecting member is bent into a U-shape about a bending axis which extends parallel to said planes and substantially perpendicular to said radial line,
   said connecting member interconnects the mounting and carrier portions at edges remote from the circumferential surface of the drum and said cylindrical surface such that said portions extend radially outward from the connecting member, and
   said adjusting device is arranged to act on said carrier portion at a location between said connecting member and the head.

2. An apparatus as claimed in claim 1, characterized in that a surface of the mounting portion directly constitutes the abutment surface of said adjusting device.

3. An apparatus as claimed in claim 1, further comprising an electrically deflectable strip extending generally parallel to said carrier portion for controllably deflecting the head in an axial direction with respect to said carrier portion, the head being fixed at one end of the strip and the other end of the strip being fixed to the carrier portion between the connecting member and the adjusting device.

4. An apparatus as claimed in claim 1, characterized in that said mount comprises at least two said connecting members, said members being flexible and spaced from each other along the respective bending axis and disposed symmetrically on opposite sides of a radial line through the magnetic head on the respective mount.

5. A rotary tape-scanning apparatus comprising:
a drum having a circumferential cylindrical surface coaxial with an axis of rotation,
means for wrapping a portion of a length of tape at least partly around said surface, and transporting the tape past the drum,
a plurality of magnetic heads,
a corresponding plurality of one-piece head mounts for mounting respective heads to the drum substantially symmetrically relative to a radial line through the axis of rotation, each head mount comprising
a planar mounting portion for fixing the respective mount to the drum,
a planar carrier portion for carrying the respective head, arranged such that the respective head extends radially outward beyond said cylindrical surface, and
at least one flexible connecting member which functions as an integral hinge and connects the respective carrier portion to the respective mounting portion such that the planes of the mounting and carrier portions extend substantially perpendicularly to said axis of rotation, each connecting member being shaped as a strip and extending substantially in a respective direction parallel to a radial line from said axis through the respective head, and
a corresponding plurality of adjusting devices including respective first abutment surfaces against which a corresponding part of each adjusting device bears, each adjusting device acting on a respective carrier portion for adjusting this carrier portion relative to the respective mounting portion in the axial direction,
characterized in that each connecting member is bent into a U-shape about a respective bending axis which extends parallel to said planes and substantially perpendicular to the respective radial line,
each connecting member interconnects the respective mounting and carrier portions at edges remote from the circumferential surface of the drum and said cylindrical surface such that said respective portions extend radially outward from the connecting member,
the apparatus comprises means for adjusting the carrier portion of at least one of said head mounts relative to the respective mounting portion in at least one direction within the plane of the respective carrier portion, said means for adjusting including at least one contact surface and one second abutment surface; and
said carrier portion of said at least one head mount comprises one of said contact and second abutment surfaces, and the respective mounting portion comprises the other of said contact and second abutment surfaces.

6. An apparatus as claimed in claim 5, characterized in that the carrier portion of said at least one head mount comprises two said contact surfaces substantially opposed to each other; and the respective mounting portion comprises two said second abutment surfaces substantially opposed to each other, for tangentially adjusting this carrier portion relative to this mounting portion in directions within the plane of the carrier portion and perpendicular to said radial line.

7. An apparatus as claimed in claim 6, characterized in that the carrier portion of said at least one head mount comprises two further, substantially opposed, contact surfaces; and the respective mounting portion comprises two further, substantially opposed, abutment surfaces, said further contact and further abutment surfaces being arranged for adjusting the carrier portion relative to the mounting portion in directions within the plane of the carrier portion coincident with said radial line.

8. An apparatus as claimed in claim 7, characterized in that the carrier portion and mounting portion of said at least one head mount are each formed with a hole therethrough, walls of said holes forming said contact and second abutment surfaces, and said further contact and further second abutment surfaces; and said holes are aligned with each other in a direction substantially parallel to the axis of rotation, arranged to receive an elongated adjustment tool for adjusting the position of the respective carrier portion within the plane of the carrier portion by acting on a contact surface formed by a portion of the bounding wall of the hole in the carrier portion and simultaneously acting against an abutment surface formed by a portion of the bounding wall of the hole in the respective mounting portion.

9. An apparatus as claimed in claim 8, characterized in that the connecting member of said at least one head mount is plastically deformable within an adjustment range for adjusting the respective carrier portion relative to the respective mounting portion in directions within the plane of the respective carrier portion.

10. An apparatus as claimed in claim 8, characterized in that the connecting member of said at least one head mount is plastically deformable within an adjustment range for adjusting the respective carrier portion relative to the respective mounting portion in directions within the plane of the carrier portion.

11. An apparatus as claimed in claim 10, characterized in that each mount comprises at least two said connecting members spaced from each other along the respective bending axis and disposed symmetrically on opposite sides of a radial line through the magnetic head on the respective mount.

12. An apparatus as claimed in claim 6, characterized in that the connecting member of said at least one head mount is plastically deformable within an adjustment range for adjusting the respective carrier portion relative to the respective mounting portion in a direction within the plane of the carrier portion and perpendicular to said radial line.

13. An apparatus as claimed in claim 12, characterized in that said at least one mount comprises at least two said connecting members spaced from each other along the respective bending axis and disposed symmetrically on opposite sides of a radial line through the magnetic head on the respective mount.

14. An apparatus as claimed in claim 5, characterized in that the carrier portion of said at least one head mount comprises two said contact surfaces substantially opposed to each other; and the respective mounting portion comprises two said second abutment surfaces substantially opposed to each other, for adjusting this carrier portion relative to this mounting portion in directions within the plane of the carrier portion coincident with said radial line.

15. An apparatus as claimed in claim 14, characterized in that the connecting member of said at least one head mount is plastically deformable within an adjustment range for adjusting the respective carrier portion relative to the respective mounting portion in a direction within the plane of the carrier portion and coincident with said radial line.

16. An apparatus as claimed in claim 15, characterized in that each mount comprises at least two said connecting members spaced from each other along the respective bending axis and disposed symmetrically on opposite sides of a radial line through the magnetic head on the respective mount.

17. An apparatus as claimed in claim 5, characterized in that the connecting member of said at least one head mount is plastically deformable within an adjustment range for adjusting the respective carrier portion relative to the respective mounting portion in at least one direction within the plane of this carrier portion.

18. An apparatus as claimed in claim 17, characterized in that said at least one mount comprises at least two said connecting members spaced from each other along the respective bending axis and disposed symmetrically on opposite sides of a radial line through the magnetic head on the respective mount.

* * * * *